Sept. 11, 1956     E. B. BYAM ET AL     2,762,064
BURR REMOVER FOR SCREW-SLOTTING MACHINES
Filed Feb. 23, 1955     5 Sheets-Sheet 1

INVENTORS
Erwin B. Byam
and Anthony K. Yndraitis
BY Rockwell & Bartholow
ATTORNEYS Sept. 11, 1956  E. B. BYAM ET AL  2,762,064
BURR REMOVER FOR SCREW-SLOTTING MACHINES
Filed Feb. 23, 1955  5 Sheets-Sheet 5

INVENTORS
Erwin B. Byam
and Anthony K. Yndiaitis
BY
Rockwell & Leichtow
ATTORNEY United States Patent Office 2,762,064
Patented Sept. 11, 1956

2,762,064

BURR REMOVER FOR SCREW-SLOTTING MACHINES

Erwin B. Byam, Wolcott, and Anthony K. Undraitis, Waterbury, Conn., assignors to The Waterbury Farrel Foundry & Machine Company, Waterbury, Conn., a corporation of Connecticut Application February 23, 1955, Serial No. 489,849

6 Claims. (Cl. 10—6)

This invention relates to a burr remover for screw-slotting machines, and more particularly to a device for removing from the heads of screws or the like the burrs which are often left by the slotting saw that cuts the slot in the head of a screw.

In the manufacture of screws, it is usual practice to feed the screw blanks to a slotted dial, each screw being received in one of the slots of the dial and carried around by rotation of the dial in a circular path. The heads of the screws project from the dial either exteriorly or interiorly, and a rotary saw or slotting tool is provided to cut a slot in the head of each of the blanks as they are carried past the saw by the dial. As illustrated in the present application, the slotting saw is mounted exteriorly of the dial, the arrangement being such that the heads of the screws project from the periphery of the dial for the slotting operation.

It often occurs that the slotting saw will leave a burr at the end of the slot, particularly that end toward which the saw moves, and it is necessary to trim this burr from the head of the screw with some type of deburring cutter in order to produce an acceptable product. The present invention pertains to the provision of a novel type of deburring or cutting mechanism to remove these burrs from the screw blanks.

In some instances a stationary cutting tool has been provided, or at any rate one which is stationary with respect to the blank and the blank has been rotated to effect engagement of this tool with the head of the screw in order to remove the burr. It is contemplated by the present invention, however, to provide a rotating tool which will be rotated past the head of the screw as the latter is carried around by the dial and remove the burr. The cutter is rotated at a comparatively rapid speed as compared to that of the screws in the dial and thus remains in engagement with the screws for only an instant. Also the speed of rotation of the cutting tool is related to the speed of rotation of the dial so that the deburring cutter or cutters will successively engage the screws as they are moved past the cutting position or station by the dial.

One object of the present invention is to provide a new and improved deburring mechanism for screw-slotting machines.

Another object of the invention is to provide a burr remover for screw-slotting machines wherein the deburring cutter is rotated so as to be moved across the head of the screw blank as the latter is being moved in a circular path by a dial which carries the blank past the slotting saw.

A still further object of the invention is to provide a new and improved burr remover for screw-slotting machines wherein the screws are fed to a dial which carries them past a slotting cutter mounted exteriorly of the dial and wherein the deburring cutter, positioned at a point to engage the screws after the slotting operation, is rotated so as to be moved over the head of the blank during the travel of the latter to remove the burr from the blank, the latter being held stationary in the dial during the deburring operation.

To these and other ends the invention consists in the novel features and combinations of parts to be hereinafter described and claimed.

Figure 1:
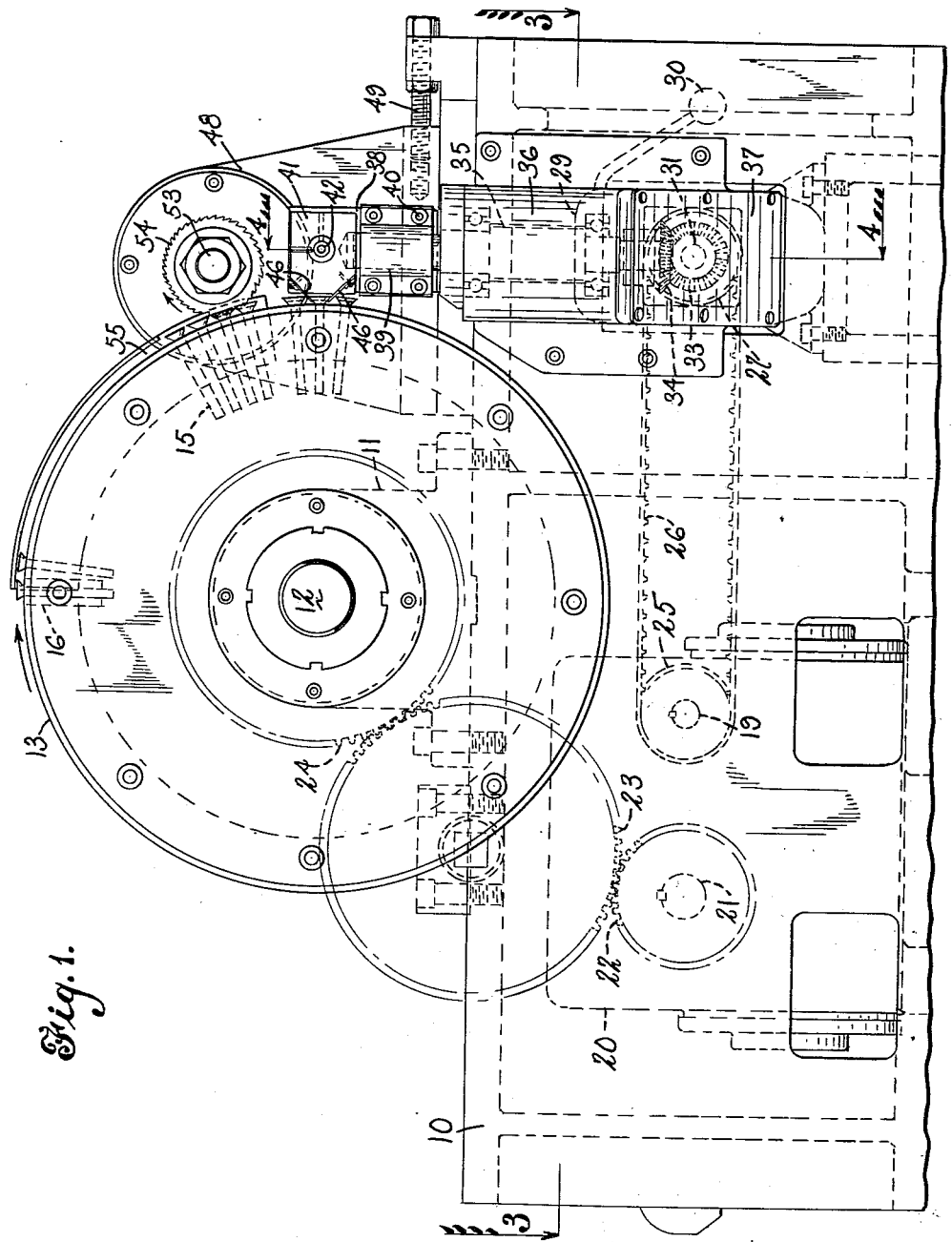
Fig. 1 is a front elevational view of a screw-slotting machine having a burr remover embodying our improvements.

To illustrate a preferred embodiment of our invention, we have shown in the drawings a screw-slotting machine comprising a base or frame 10 provided with a bearing 11 in which is rotatably mounted a shaft 12 carrying a dial 13. This dial is provided with a plurality of slots 14 in its rear face adapted to receive the screw blanks designated as 15 from a chute 16. It will be understood that according to the usual practice screws are fed to the chute 16 from a hopper, not shown.

Figure 2:
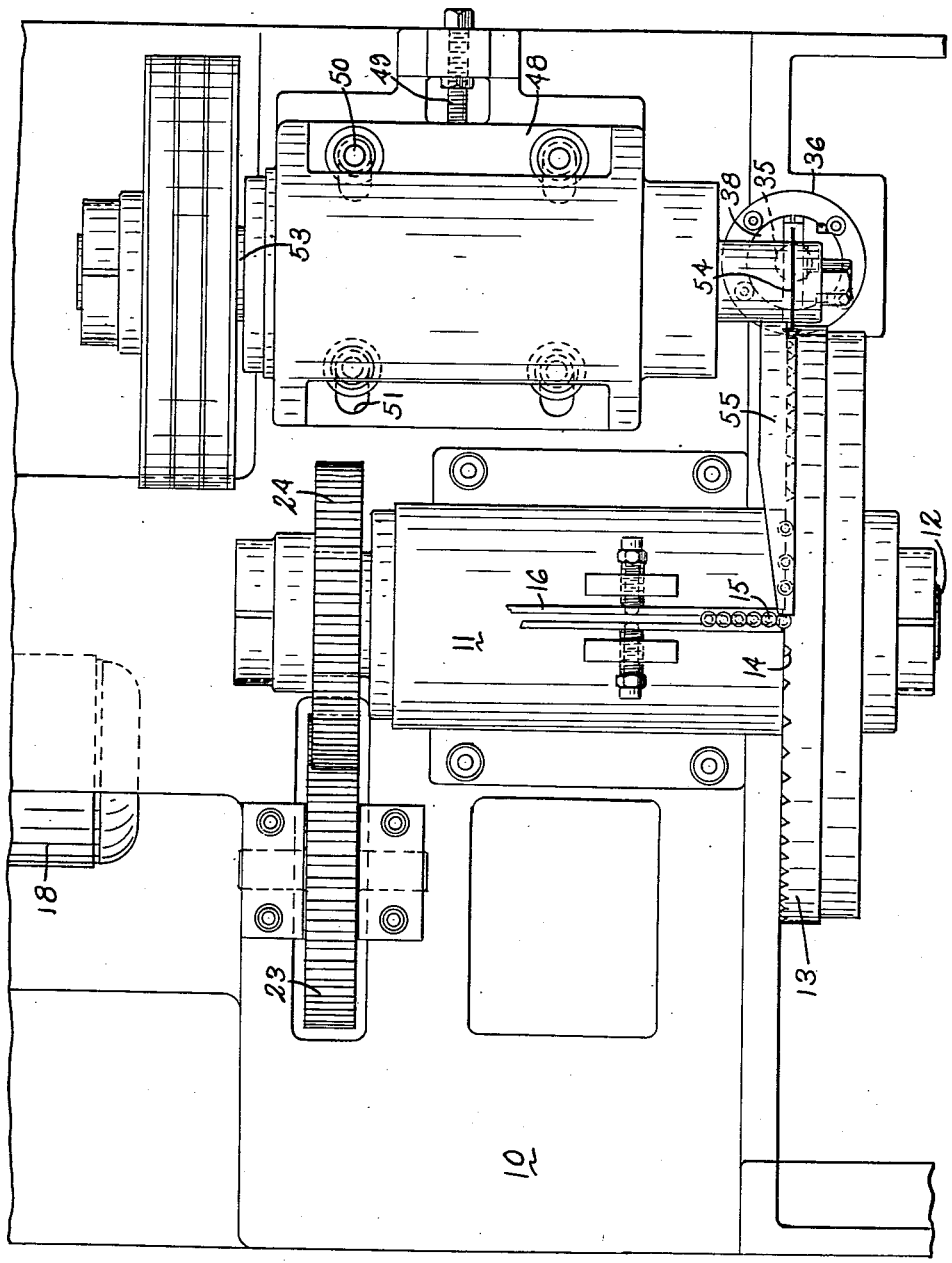
Fig. 2 is a top plan view thereof.
Figure 3:
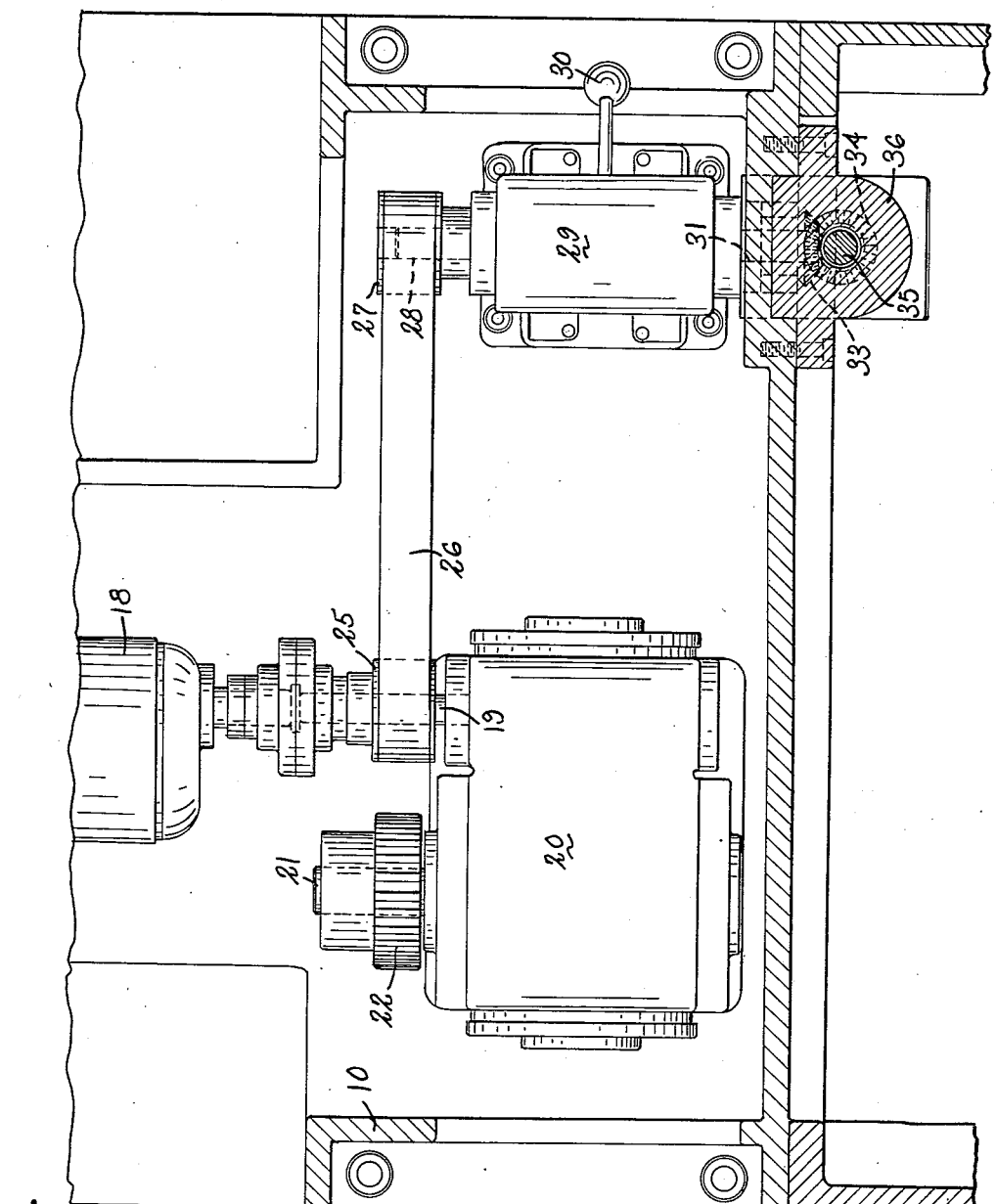
Fig. 3 is a sectional view on line 3—3 of Fig. 1.

Mounted on the frame of the machine is a driving motor 18 (Fig. 3) which drives a shaft 19, which shaft through transmission gearing (not shown) in the housing 20 drives a shaft 21 having a gear 22 thereon. The gear 22, as shown in Figs. 1 and 2, is in mesh with a gear 23, the teeth of which in turn mesh with a gear 24 upon the shaft 12 so that the dial 13 is driven from the motor 18.

Also mounted upon the shaft 19 which is driven by the motor is a pulley 25 around which is trained the belt 26. This belt drives a pulley 27 on a shaft 28 which latter shaft projects from a change-speed transmission gearing mounted in the housing 29. A gear shift lever 30 projects from the housing to shift the gears and regulate the speed of the output shaft 31 (Fig. 4) which projects from the front of the housing, the shaft 28 entering the rear thereof.

Figure 4:
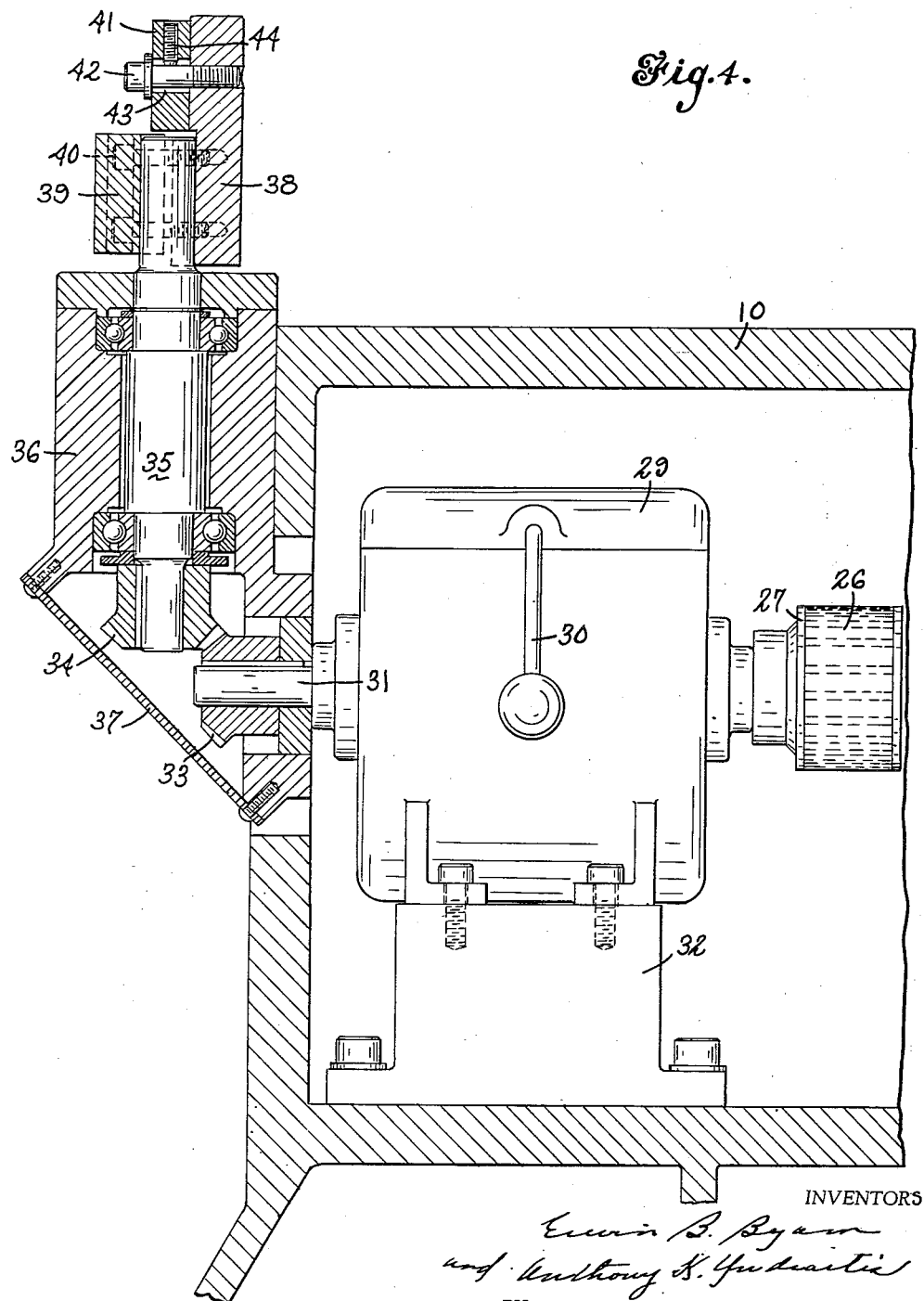
Fig. 4 is a sectional view on line 4—4 of Fig. 1.

The transmission housing 29, as shown in Fig. 4, may be mounted upon a base 32 supported upon the main frame 10, and the shaft 31 which projects through the front of the frame as shown on this figure has keyed thereon a bevel gear 33, the teeth of which mesh with those of a bevel gear 34 on a vertical shaft 35 rotatably mounted in a housing 36 on the front of the main frame 10. The gears 33 and 34 may be covered by the plate 37.

Figure 5:
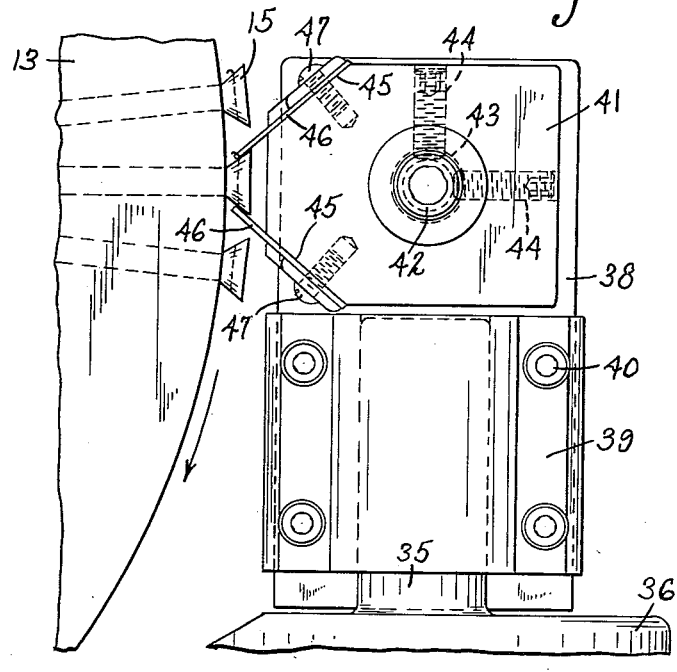
Fig. 5 is an enlarged detail view of the deburring cutter and associated mechanism.
Figure 6:
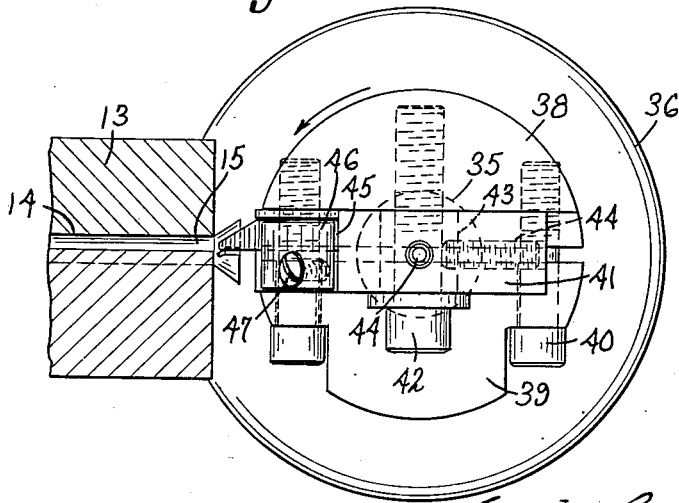
Fig. 6 is a top plan view of the mechanism shown in Fig. 5.

As shown in Figs. 4, 5 and 6, the deburring cutting mechanism is mounted upon the upper end of the shaft 35. The upper end of this shaft is slightly reduced, and upon the upper reduced end which projects from the housing 36 is a cutter support 38 clamped to the shaft 35 by the clamping plate 39, this plate being secured to the support 38 by screws 40.

A cutter block 41 is secured to the support 38 by a lag screw 42 threaded into the member 38 and passing through an oversized opening 43 in the block 41. This oversized opening permits the adjustment of the block 41 upon the member 38, this adjustment being effected by the adjusting screws 44 and the tightening of the screw 42 will hold the block in its adjusted position. As shown more especially in Figs. 5 and 6, the block 41 is provided with inclined surfaces 45 at one end thereof and upon these surfaces are secured cutting blades 46 by the screws 47. These cutting blades, as shown in Fig. 5, project from the edge of the block in position to fit snugly against the lateral faces of the heads of the screw blanks so as to remove the burrs therefrom as the cutters are rotated.

Also mounted on the frame of the machine is a standard 48 (Figs. 1 and 2) which may be adjusted toward and from the dial 13 by the adjusting screw 49. This standard is bolted to the frame by the bolts 50 which extend through elongated openings 51 in the base of the standard.

Rotatably mounted in the standard 48 is a shaft 53 upon which is secured the slotting saw 54 which, as shown in these figures, is in position to engage the faces of the heads of the blanks and cut a slot therein as they are carried past the saw position by the rotation of the dial about the axis of the shaft 12.

A presser bar 55 (Fig. 2) may be provided to engage the screw blanks and hold them in the slots 14 in the dial while they are being carried from the chute 16 past the slotting saw and also past the deburring cutters so that the blanks will be held against movement in the dial during the slotting and deburring operations.

In the operation of the device the blanks are fed to the slots 14 in the dial at the upper portion of this member, as shown in Figs. 1 and 2. The dial rotates in a clockwise direction, as shown by the arrow in Fig. 1, so that the blanks are carried past the slotting saw which cuts the slots in the outer faces of the heads of the blanks. From the cutting saw the blanks are carried past the deburring cutters by the rotation of the dial and as they pass this mechanism any burrs which may have been left by the saw are removed by the deburring cutters 46.

It is understood that the deburring cutters rotate about a vertical axis, as shown in Figs. 1 and 4, and the cutters make a complete revolution in the period required for the dial to move the distance between two adjacent slots, that is, as shown in Fig. 1, the cutters wipe across the beveled head of one of the blanks and then rotate through a complete revolution so that when the next blank has arrived at a point opposite the space between the cutters, the latter will engage and wipe across the beveled heads of this blank. To this end the speed of rotation of the cutters must be related to the speed of rotation of the dial, and this is readily achieved in the present structure as both are driven from the same shaft 19. It will be apparent that as the dial 13 continually rotates, the blank will theoretically move a short distance while it is engaged by the cutters, but as the speed of rotation of the latter is quite high compared to that of the dial, the cutters will only engage the blank for an instant and the latter may be considered as stationary during this short period.

It may be desired to use dials having slots 14 which are spaced apart a different distance, and in order that the machine may be employed with dials having differently spaced slots, the change-speed transmission 29 is provided. Thus by operation of the shift lever 30, the speed of the output shaft 31 may be varied with respect to that of the input shaft 28 so that the speed of the cutters may be regulated according to the spacing of the slots in the dial. After this adjustment has been made the machine may be operated at any desired speed for as both the dial and the cutters receive their power from the shaft 19, any change in speed of this shaft will be imparted to both dial and cutters proportionately.

It will be understood that the cutter blades 46 are flexible so that they may flex to some extent and thus ride over the heads of the screw blanks so as to follow the outline of the head and sever the burr closely to the head of the blank. While this feature of flexibility in the cutter blades is preferred, it will not always be necessary as the blades may be rigid and still operate effectively to remove the burrs.

It may also be noted that the ends of the cutters may be shaped to accommodate blank heads of various shapes. As shown, the cutter blades are straight to be used with flat head screws. In the case of a round headed screw, the free end of the blade would be curved outwardly to follow the outline of the head, while in the case of a screw with a fillister head, the cutter would be bent out at an angle to the body portion so that the free ends of the cutters would be substantially parallel.

While we have shown and described a preferred embodiment of our invention, it will be understood that it is not to be limited to all of the details shown, but is capable of modification and variation within the spirit of the invention and within the scope of the claims.

What we claim is:

1. A screw-slotting machine comprising a rotatably mounted dial, the face of which is provided with radially directed slots to receive screw blanks with their heads projecting radially from the periphery of the dial, a cutter shaft, means for mounting said shaft for rotation about an axis substantially in the plane of the face of the dial and substantially perpendicular to the axis of rotation of the dial, a cutter carried by the shaft and projecting radially therefrom toward the periphery of the dial to move into and out of the path of the heads of the blanks as they are carried therepast by the dial, and means for continuously rotating the dial and the cutter shaft.

2. A screw-slotting machine comprising a rotatably mounted dial, the face of which is provided with radially directed slots to receive screw blanks with their heads projecting radially from the periphery of the dial, a cutter shaft, means for mounting said shaft for rotation about an axis substantially in the plane of the fact of the dial and substantially perpendicular to the axis of rotation of the dial, a cutter carried by the shaft and projecting radially therefrom toward the periphery of the dial to move into and out of the path of the heads of the blanks as they are carried therepast by the dial, means for continuously rotating said dial, and means for rotating said cutter shaft in timed relation to the rotation of the dial.

3. A screw-slotting machine comprising a rotatably mounted dial, the face of which is provided with radially directed slots to receive screw blanks with their heads projecting from the periphery of the dial, slotting means mounted adjacent the dial to slot the heads of the blanks as they are carried past the slotting means by the dial, a cutter shaft adjacent the periphery of the dial, a cutter carried by said shaft and projecting therefrom toward the heads of the blanks, means for mounting said cutter shaft for rotation about an axis substantially parallel to the direction of movement of the blanks as they pass the cutter to cause the latter to sweep past the head of a moving blank to cut a burr therefrom, and means for rotating said dial and for rotating the cutter shaft in timed relation to the rotation of the dial.

4. A screw-slotting machine comprising a rotatably mounted dial, the face of which is provided with radially directed slots to receive screw blanks with their heads projecting from the periphery of the dial, slotting means mounted adjacent the dial to slot the heads of the blanks as they are carried past the slotting means by the dial, a cutter shaft adjacent the periphery of the dial, a cutter carried by said shaft and projecting therefrom toward the heads of the blanks, means for mounting said cutter shaft for rotation about an axis substantially parallel to the direction of movement of the blanks as they pass the cutter to cause the latter to sweep past the head of a moving blank to cut a burr therefrom, means for rotating said dial and for rotating the cutter shaft in timed relation to the rotation of the dial, and means for holding the blanks in fixed position in the dial while they are engaged by the cutter.

5. A screw-slotting machine as in claim 1 wherein speed-changing means is provided to vary the speed of the cutter shaft with relation to that of the dial.

6. A screw-slotting machine comprising a rotatably mounted carrier dial having means thereon to receive screw blanks with their heads projecting from the periphery of the dial, means for continuously rotating said dial, a cutter shaft mounted adjacent the periphery of the dial upon an axis substantially at right angles to the axis of the dial and in spaced relation to the periphery of the dial, a cutter mounted on said shaft and projecting toward the heads of the blanks, and means for rotating said cutter shaft in timed relation to the rotation of the dial to cause it to sweep past the head of a moving blank and cut a burr therefrom.

References Cited in the file of this patent

UNITED STATES PATENTS

| | | |
|---|---|---|
| 638,361 | Schumann | Dec. 5, 1899 |
| 2,531,240 | Wilcox | Nov. 21, 1950 |
| 2,741,784 | Fray | Apr. 17, 1956 |